Oct. 23, 1962  H. R. PURSEL  3,059,893
CUT-OFF GATE TYPE VALVE
Filed June 29, 1959

INVENTOR.
HAROLD R. PURSEL

Oct. 23, 1962 H. R. PURSEL 3,059,893
CUT-OFF GATE TYPE VALVE
Filed June 29, 1959 2 Sheets-Sheet 2
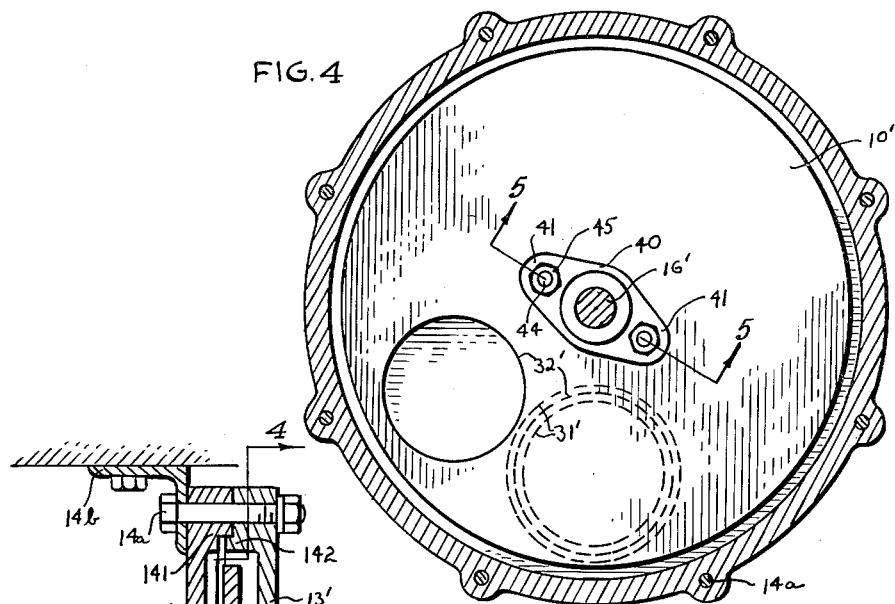
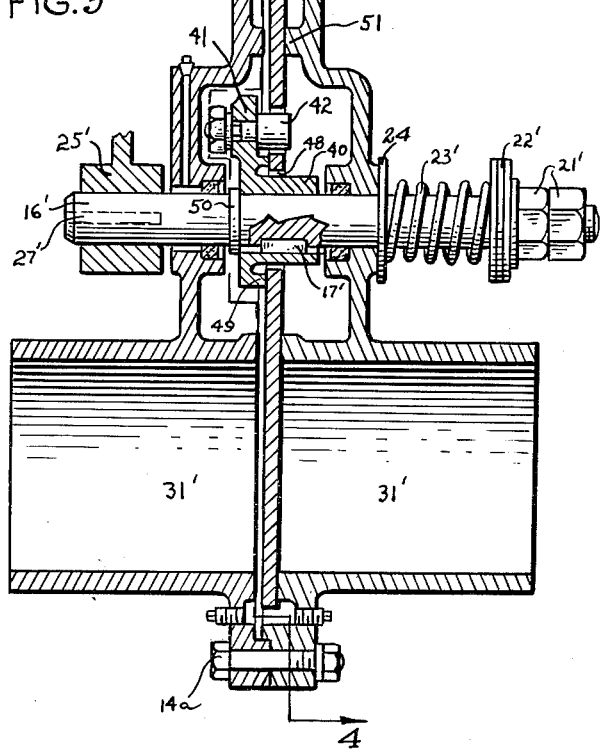
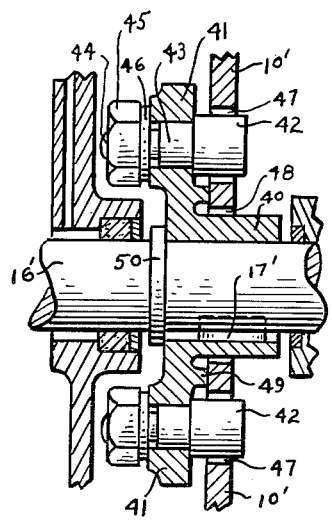
INVENTOR.
HAROLD. R. PURSEL
BY Leo Edelson
ATTORNEY 3,059,893
CUT-OFF GATE TYPE VALVE
Harold R. Pursel, Philadelphia, Pa., assignor to Beaumont Birch Company, a corporation of Pennsylvania
Filed June 29, 1959, Ser. No. 823,679
6 Claims. (Cl. 251—77)

This invention relates generally to flow control devices for pneumatic conveying systems. More particularly this invention relates to improvements in the construction of a gate type valve for cutting off the flow in a system for handling finely subdivided solids, such as flyash and the like.

Gate type valves per se are not new, but it has been found that known types of such valves suffer from several deficiencies when an attempt is made to employ heretofore known designs in conduit systems for transmitting relatively finely divided solid material. Most known valves for such application do not provide adequate means for preventing the conduited material from escaping out of the flow system into the atmosphere. Thus, a substantial quantity of material may be lost over a period of time, and there further arises the undesirable condition of air pollution by the escaped particles of material. Should such material be toxic in nature, inhalation of the airborne particles may result in a serious health hazard to personnel in the vicinity.

Some enclosed valves for use in conduiting finely divided solids have appeared in the art, but these valves are all subject to the necessity for periodic cleaning because their construction is such that after an interval of use they become packed with the material being transferred through the valve, and the valve gate is rendered either immovable or of such restricted movement that the valving action is lost.

Completely enclosed valves are, of course, known and utilized for other purposes as well, as for example in gas conduit systems. These valves however employ gasketing elements to effect the valve seal. It has been found however that gasketed valves of the known types are generally rendered inoperative in a short time when employed in a conduiting system for finely divided solids. The finely divided solid particles in time work their way between the gasket and the gasket-holding portion of the valve, with the result that the gasket is eventually at least partially displaced from its proper location and deformed to such an extent that the seal is destroyed and/or the valve becomes bound so as to render it inoperative.

Finally, there exists yet another problem peculiar to systems for handling finely divided solid particles which may be simply stated as a problem of abrasion. When a valve is open the constant flow of innumerable fine particles over the valve seat produces erosion of the seat edges and in time causes an alteration of the seat resulting in the inability to completely close the valve. This condition is of course highly undesirable since its occurrence usually requires that the valve be replaced. Such valve replacement is costly, particularly when an entire system must be shut down to effect the valve replacement.

My invention is directed toward the elimination of the foregoing described difficulties associated with known valve types and contemplates as a principal object the provision of a non-clogging, non-binding, self-seating valve.

A further object of the present invention is to provide such a valve which is a self contained unit and in which the gate member is so encased by the gate body that material loss to the atmosphere is eliminated.

Another important object of the present invention is to provide such a valve unit with means for constantly biasing the gate in gate seating direction.

Still another object of the present invention is to provide such a gate unit which may be utilized with equal efficiency either in a vertically or a horizontally extending conduit.

Other objects and advantages of the present invention will appear more fully hereinafter, it being understood that the invention consists substantially in the combination, construction, location and relative arrangement of parts, all as described in the accompanying drawings and as finally pointed out in the appended claims.

In the accompanying drawings:

FIGURE 3 is an enlarged section taken on line 3—3 of FIGURE 2;

FIGURE 4 is a reduced section taken on line 4—4 of FIGURE 3;

FIGURE 5 is an enlarged fragmented section taken along the line 5—5 of FIGURE 4.

In the several figures, like elements are denoted by like reference characters.

Figure 2:
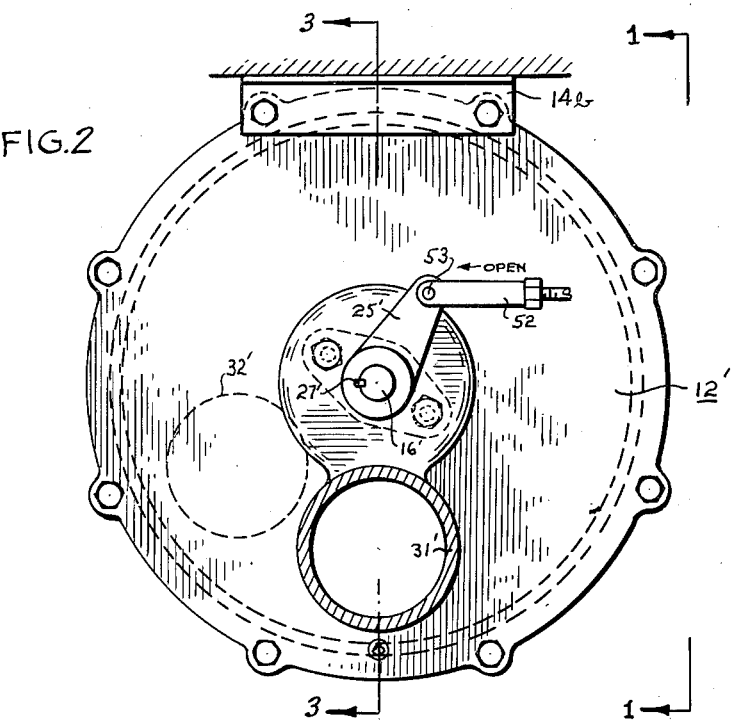
FIGURE 2 is a sectional view taken on line 2—2 of FIGURE 1, the valve being shown closed.

Referring now to the drawings, and principally to FIGURE 3, there will be seen a gate member in the form of a centrally apertured circular disc 10', a shaft 16' having a hub structure 40 secured thereon by means of the keying element 17' and retaining ring 50, and a gate body formed by a pair of sections 12'—12' that are disposed respectively on opposite sides of the hub 40 and gate member 10' and which conjointly form a hollow housing for the latter, the shaft 16' passing through and being revolubly journalled in the housing sections 12'—12' and extending outward therefrom in opposite directions.

The gate body sections 12' include flat wall regions 13' spaced from and substantially parallel to the gate disc 10', and complementally shaped interfitting peripherally extending flanges 141 and 142, these flanges lying radially outward from the edge of the gate disc in spaced relation thereto and forming an airtight gate body edge seal. The body sections 12'—12' are secured together by a plurality of bolts 14a projected through circumferentially spaced portions of the flanges 141 and 142, and these bolts may also be utilized for securing the gate body to supporting brackets 14b. The hub 40 is seen to include a pair of diametrically opposed arms 41 extending radially outwardly from the shaft 16', the hub arms 41 being apertured proximate the arm ends in a direction substantially parallel to the axis of the shaft 16'.

Projected through each of the apertures in the hub arms 41 is a stepped diameter stud having a right-hand section of larger diameter than the aperture through the hub arms and indicated generally at 42, a reduced diameter section 43 immediately to the left of the section 42 and of a diameter substantially equal to the aperture through the hub arms, and a further reduced left-hand section 44 which is threaded to receive a nut 45. As the nut 45 is threaded onto the stud end 44, the stud is shifted toward the left until the left-hand face of the large diameter section 42 bearingly engages the right-hand surface of the hub arm 41, and is firmly seated thereagainst as the nut 45 is tightened to place the lock washer 46 into compression between the nut and the left-hand face of the hub arms 41. The studs ends 42 are seen to project loosely through apertures 47 in the disc gate member 10' and the disc 10' is further seen to be centrally apertured, as at 48, so that the hub 40 keyed to the shaft 16' extends loosely therethrough. Formed on the right-hand face of the hub arms just radially outwardly of the hub 40 itself is an annular ridge 49 which projects toward the right and bears against the left-hand face of the disc 10' in the region immediately adjacent the central aperture 48 in the disc.

Disposed upon the downstream portion of the shaft 16' which projects externally of the downstream housing section 12' are washers 22' and 24 which hold in position therebetween the compression coil spring 23' through which the shaft 16' extends, the washers and coil spring being secured upon the shaft by the nuts 21' threaded onto the shaft end. The opposite end of the shaft has secured thereto a crank arm 25' operable to open and close the gate in a manner to be subsequently described.

Below the shaft 16' are a pair of coaxially related conduit sections 31'—31' that extend parallel to the shaft 16'. These conduits are disposed respectively on opposite sides of the disc 10', each being integrally formed with the associated gate body wall 13'. The distance between the proximate ends of the conduits 31'—31' is slightly greater than the thickness of the disc 10'. The proximate end portions of the conduits 31'—31' form annular elements extending inwardly respectively from the gate body walls 13'—13', from which elements the conduits 31'—31' extend outwardly in opposite directions, the remote end portions thereof being adapted for connection into a conduit system.

It will be observed that the shaft 16' is biased toward the right by the compression spring 23'. Thus, the hub 40 is also biased to the right by means of the retaining ring 50 disposed about the shaft 16' and bearing against the left-hand face of the hub 40. The annular ridge 49 therefore biases the disc 10' toward the right into seating engagement with the left-hand face of the downstream conduit section 31' which is seen to be disposed below and substantially parallel to the shaft 16'. In order to insure that the disc 10' seats flush against the left-hand face of the downstream conduit section 31', a ridge 51 is formed on the inside surface of the right-hand gate body section 12' in the region above the shaft 16' as viewed in FIGURE 7 diametrically opposite the conduit section 31'. Without the ridge 51, it would be apparent that the disc 10' would assume a cocked position relative to the face of the conduit section 31' and would not provide a seal therefor. The left-hand face of the ridge 51 is therefore formed to be disposed in the same plane as the left-hand face of the downstream conduit section 31', as by grinding or in any other convenient manner.

The purpose of the stud portions 42 secured to the hub arms 41 and projecting loosely through the holes 47 in the disc 10' is to effect rotation of the disc for the purpose of opening or closing the gate. When the shaft 16' is rotated on its axis by means to be described, the hub 40 is carried with it by virtue of the keying element 17' which interlocks the hub to the shaft 16', so that the stud ends 42 are rotated into bearing engagement with the sides of the holes 47 in the disc 10' and therefore rotate the disc with the shaft. Due to the relatively loose connection between the gate disc 10' and the shaft and hub assembly it will be now appreciated that an exact and precise condition of alignment between the axis of the shaft 16' and the axis of the downstream conduit section 31' is no longer necessary. The only necessary conditions are that the left-hand face of the ridge 51 be coplanar with the face of the downstream conduit section 31', and that the plane so established should be coincident with the plane of the right-hand face of the disc 10'. The foregoing conditions are relatively easily met by surface grinding of the disc 10' and the ridge 51 and left-hand face of the downstream conduit section 31'.

Figure 1:
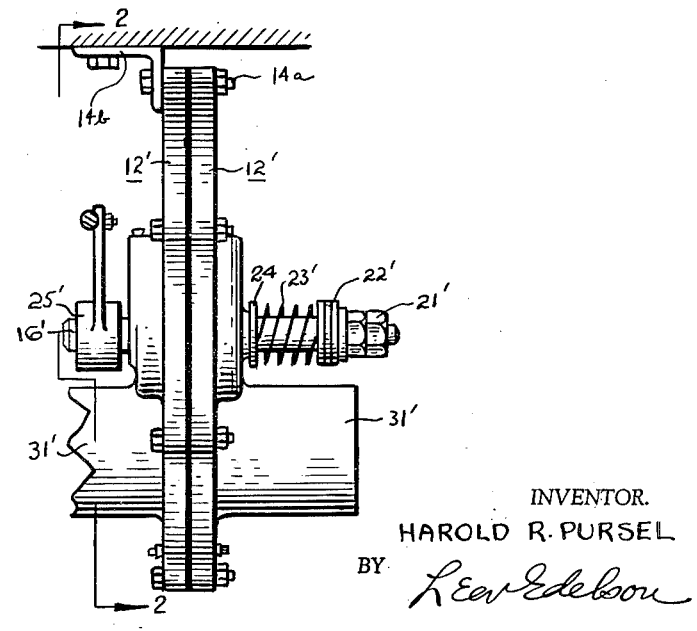
FIGURE 1 is a side elevation of a cut-off gate valve constructed in accordance with and embodying the principles of the present invention.

As is most clearly seen in FIGURES 1, 2 and 3, a crank arm 25' is illustrated as non-rotatably secured to the left-hand end of the shaft 16' by means of the keying element 27' so that the crank arm 25' and shaft 16' are rotatable as a unit. As best seen in FIGURE 2 a link member 52 is pivotally connected to the outer end of the crank arm 25' by pivot means 53, so that when the link 52 is shifted to the left, by drive means not illustrated, the crank arm 25' will be rotated counterclockwise and the aperture 32' in the gate member disc 10' will be rotated into registry with the conduit sections 31', thus opening the gate. Conversely, when the link 52 is shifted toward the right the aperture 32' will be rotated clockwise out of alignment with the conduit sections 31' and the unapertured part of the disc 10' blocks the material in the upstream conduit section 31' from being transferred to the downstream section.

Due to the circular disc shape of the gate member 10', it may be swung about the shaft 16' in either direction without displacing or shifting in its own plane any of the material conveyed in the system and which may completely surround the gate member. In other words, the circular gate member of the present invention does not present at any time any edge which is required to move linearly through the material and which might tend to become so solidly packed in advance of such an edge as to cause binding of the gate and prevent free and proper operation thereof.

While it is preferable to employ the coiled spring 23' or other suitable means for imparting to the gate member a positive bias in downstream direction to insure constant engagement of the downstream face of the gate member against its seat formed by the proximate end of the downstream conduit section 31', it will be understood that in certain instances the spring may be dispensed with. For example, in a vacuum or other fluid pressure differential system, the pull of the vacuum or of the fluid pressure differential may in itself be sufficient to maintain the gate against its seat to insure sealing off of the conduit. Where the gate is employed in a vertical conduit, its own weight may be sufficient to insure its retention against its seat tightly enough to seal off the conduit. Thus, an important feature of the present invention is that the downstream face of the gate member is at all times adapted to contact flatwise against its downstream seat, with the result that the gate, when in its conduit closing position, operates effectively to interrupt movement of material through the conduit. When the gate member is thus maintained in constant wiping contact with its downstream seat, the latter is maintained free and clear of solids such as would tend not only to hold the gate away from its seat and so permit bleeding of material past the gate when it was in its closed position but also to cause premature wear of the seat and gate due to the abrasive effect of the material present between the gate and its seat.

Not only is the circular gate member non-clogging in its action, but also because of the fact that it is totally enclosed, there is no possible loss to atmosphere of the material being conveyed.

It will be understood, of course, that the present invention as hereinbefore described in connection with the particularly illustrated embodiment shown in the accompanying drawings is susceptible of various changes and modifications which may be made from time to time without departing from the general principles or real spirit of the invention, and, accordingly, it is intended to claim the same broadly, as well as specifically, as indicated by the appended claims.

What is claimed as new and useful is:

1. A gate valve for controlling the flow of material through a conduit system comprising, a centrally apertured circular disc gate member having first and second off-center apertures therethrough, a housing enclosing said disc, a shaft passed through the disc central aperture rotatably journalled in the housing walls and extending outwardly therethrough for connection to means located externally of said housing for effecting shaft rotation, coupling means rigidly coupled to said shaft and loosely coupled to said disc for effecting rotation of said disc with said shaft, whereby said disc is free to shift relative to said shaft within limits imposed by said coupling means, said coupling means including a first portion radially offset from said shaft and projected loosely through said second off-center disc aperture, said shaft when rotated causing said radially offset portion of said coupling means to bear against the edge of said second off-center disc aperture to thereby rotate the disc, a pair of colinearly-aligned spaced-apart conduit sections forming part of said housing, one open end of each of said conduit sections presenting into the housing interior and facing opposite surfaces respectively of said disc, the remaining open end of each of said conduit sections being adapted for connection into a conduit system to thereby seal the housing interior from the atmosphere external to the conduit system, and means for biasing said disc into sealing engagement with the interiorly presenting open end of one of said conduit sections, said disc biasing means comprising a second portion of said coupling means and means for axially biasing said shaft to shift said coupling means second portion against one surface of said disc to thereby shift said disc into sealing engagement with said conduit section as aforesaid, said first off-center aperture in said disc being rotatable into registration with said conduit sections open ends when said rotation means is actuated to open said valve by rotating said disc.

2. A gate valve for controlling the flow of material through a conduit system comprising, a circular disc gate member having a first off-center aperture therethrough, a housing enclosing said disc, a shaft rotatably journalled in the walls of said housing and extending outwardly therethrough for connection to means located externally of said housing for effecting shaft rotation, means coupling said disc to said shaft for rotation therewith, said disc being centrally apertured to permit passage of said shaft therethrough, said means coupling said disc to said shaft being rigidly coupled to said shaft and loosely coupled to said disc, whereby said disc is free to shift relative to said shaft within limits imposed by said coupling means, a pair of colinearly-aligned spaced-apart conduit sections forming part of said housing, one open end of each of said conduit sections presenting into the housing interior and facing opposite surfaces respectively of said disc, the remaining open end of each of said conduit sections being adapted for connection into a conduit system to thereby seal the housing interior from the atmosphere external to the conduit system, means for biasing said disc into sealing engagement with the interiorly presenting open end of one of said conduit sections, said first off-center aperture in said disc being rotatable into registration with said conduit sections open ends when said rotation means is actuated to open said valve by rotating said disc about said axis.

3. A gate valve for controlling the flow of material through a conduit system comprising, a centrally apertured circular disc gate member having first and second off-center apertures therethrough, a housing enclosing said disc, a shaft passed through the disc central aperture rotatably journalled in the housing walls and extending outwardly therethrough for connection to means located externally of said housing for effecting shaft rotation, coupling means rigidly coupled to said shaft and loosely coupled to said disc for effecting rotation of said disc with said shaft, whereby said disc is free to shift relative to said shaft within limits imposed by said coupling means, said coupling means including a first portion radially offset from said shaft and projected loosely through said second off-center disc aperture, said shaft when rotated causing said radially offset portion of said coupling means to bear against the edge of said second off-center disc aperture to thereby rotate the disc, a pair of colinearly-aligned spaced-apart conduit sections forming part of said housing, one open end of each of said conduit sections presenting into the housing interior and facing opposite surfaces respectively of said disc, the remaining open end of each of said conduit sections being adapted for connection into a conduit system to thereby seal the housing interior from the atmosphere external to the conduit system, means for biasing said disc into sealing engagement with the interiorly presenting open end of one of said conduit sections, and disc positioning means within said housing for aligning the plane of said disc with the open end of said conduit section to insure sealing of the latter when said biasing means biases said disc into sealing engagement with the conduit open end, said first off-center aperture in said disc being rotatable into registration with said conduit sections open ends when said rotation means is actuated to open said valve by rotating said disc.

4. The gate valve according to claim 3 wherein said disc positioning means comprises a ridge projecting from the inside of the housing toward said disc, said ridge being located on the opposite side of said shaft from the said conduit sections and having a disc engaging face coplanar with the sealable end of the disc-sealable conduit section, and wherein said disc biasing means comprises a second portion of said coupling means and means for axially biasing said shaft to shift said coupling means second portion against the non-sealing surface of said disc between said ridge and sealable conduit section to thereby shift said disc into engagement with said ridge and into sealing engagement with said conduit section.

5. A gate valve for controlling the flow of material through a conduit system comprising, a circular disc gate member having an off-center aperture therethrough, a housing enclosing said disc, a shaft rotatably journalled in the walls of said housing and extending outwardly therethrough for connection to means located externally of said housing for effecting shaft rotation, said disc being centrally apertured to permit passage of said shaft therethrough, means coupling said disc to said shaft, said disc and coupling means being respectively provided with coacting elements operative to transmit rotational effort of said shaft to said disc and simultaneously permit axial movement of said disc relatively to said shaft, a pair of colinearly-aligned spaced-apart conduit sections forming part of said housing, one open end of each of said conduit sections presenting into the housing interior and facing opposite surfaces respectively of said disc, the remaining open end of each of said conduit sections being adapted for connection into a conduit system to thereby seal the housing interior from the atmosphere external to the conduit system, means for biasing said disc into sealing engagement with the interiorly presenting open end of one of said conduit sections, said off-center aperture in said disc being rotatable into registration with said conduit sections open ends when said rotation means is actuated to open said valve by rotating said disc about said axis.

6. The gate valve according to claim 2 wherein said coupling means includes a first portion radially offset from said shaft and projected loosely through a second off-center aperture in said disc, said shaft when rotated causing said radially off-set portion of said coupling means to bear against the edge of said second off-center disc aperture to thereby rotate the disc.

References Cited in the file of this patent

UNITED STATES PATENTS

| 863,004 | Smith | Aug. 13, 1907 |
| 1,448,941 | Powell | Mar. 20, 1923 |
| 1,798,952 | Pellegrino | Mar. 31, 1931 |
| 1,813,100 | Swindle | July 7, 1931 |
| 2,273,720 | Morrow | Feb. 17, 1942 |
| 2,387,397 | Hill | Oct. 23, 1945 |
| 2,805,836 | Taylor | Sept. 10, 1957 |
| 2,892,609 | Bibbo | June 30, 1959 |

FOREIGN PATENTS

| 720,086 | Germany | Apr. 23, 1942 |
| 1,035,192 | France | Apr. 15, 1953 |